(12) United States Patent
Furter et al.

(10) Patent No.: US 6,972,664 B2
(45) Date of Patent: Dec. 6, 2005

(54) TRANSPONDER DEVICE FOR THE IDENTIFICATION OF OBJECTS IN FRONT OF PIECES OF EQUIPMENT

(75) Inventors: Urs Furter, Noville (CH); Eric Suligoj, Renens (CH)

(73) Assignee: Sokymat Automotive GmbH, Reichshof-Wehnrath (DE)

(*) Notice: Subject to any disclaimer, the term of this patent is extended or adjusted under 35 U.S.C. 154(b) by 295 days.

(21) Appl. No.: 10/203,947

(22) PCT Filed: Feb. 13, 2001

(86) PCT No.: PCT/EP01/01567

§ 371 (c)(1),
(2), (4) Date: Nov. 21, 2002

(87) PCT Pub. No.: WO01/61641

PCT Pub. Date: Aug. 23, 2001

(65) Prior Publication Data

US 2003/0141963 A1 Jul. 31, 2003

(30) Foreign Application Priority Data

Feb. 15, 2000 (DE) ................................ 100 06 816

(51) Int. Cl.[7] .......................... H04Q 5/22; G08B 13/14; G06K 19/06
(52) U.S. Cl. ............................... 340/10.51; 340/572.1; 340/10.1; 235/492
(58) Field of Search .......................... 340/10.51, 572.1, 340/10.1, 10.6; 235/492; 257/E23.069

(56) References Cited

U.S. PATENT DOCUMENTS

| | | | |
|---|---|---|---|
| 4,942,534 A | * | 7/1990 | Yokoyama et al. ........ 340/10.1 |
| 5,208,450 A | * | 5/1993 | Uenishi et al. ............. 235/492 |
| 5,770,849 A | * | 6/1998 | Novis et al. ................ 235/492 |
| 5,773,812 A | * | 6/1998 | Kreft .......................... 235/492 |
| 6,068,191 A | * | 5/2000 | Dlugosch et al. .......... 235/492 |
| 6,190,942 B1 | | 2/2001 | Wilm et al. |
| 6,375,082 B1 | * | 4/2002 | Kobayashi et al. ........ 235/492 |
| 6,378,774 B1 | * | 4/2002 | Emori et al. ............... 235/492 |
| 6,484,260 B1 | * | 11/2002 | Scott et al. ................. 713/186 |

FOREIGN PATENT DOCUMENTS

DE 196 28 802 A1 1/1998

(Continued)

OTHER PUBLICATIONS

Code of Federal Regulations, Title 47, vol. 5, Chapter I, Parts 90.22 and 90.20.*

Primary Examiner—Brian Zimmerman
Assistant Examiner—Clara Yang
(74) Attorney, Agent, or Firm—Proskauer Rose LLP

(57) ABSTRACT

A transponder device for the identification of objects in front of pieces of equipment, with an integrated switching circuit, with a first driver and with a carrier accommodating a circuit, whereby the first driver and the switching circuit are deposited on a first surface of the carrier, and whereby a plurality of contract points are deposited on a second surface of the carrier. In order to make available a transponder device with which the integrated switching circuit of the transponder can be used from outside the encapsulation and on repeated occasions, provision is made such that the integrated switching circuit and the first driver are encapsulated with the carrier in such a way that the integrated switching circuit and the first driver can be contacted electronically from outside the encapsulation solely via the contact points, and that the integrated switching circuit encodes the first signal for the first driver.

21 Claims, 3 Drawing Sheets

FOREIGN PATENT DOCUMENTS

| DE | 197 53 619 A1 | 5/1999 |
| WO | WO 94/09388 | 4/1994 |
| WO | WO 97/12263 | 4/1997 |
| WO | WO 99/26197 | 5/1999 |

* cited by examiner

TRANSPONDER DEVICE FOR THE IDENTIFICATION OF OBJECTS IN FRONT OF PIECES OF EQUIPMENT

BACKGROUND OF THE INVENTION

The present invention relates to a transponder device for the identification of objects in front of pieces of equipment, with an integrated switching circuit, with a first driver and with a carrier accommodating a circuit, whereby the first driver and the integrated switching circuit are deposited on a first surface of the carrier, whereby a plurality of contact points are deposited on a second surface of the carrier and whereby the contact points are connected electrically to the switching circuit and the first driver. The carrier accommodating the circuit can be formed by a circuit board, an encapsulated circuit or any other material accommodating a circuit as well as a mixed form of the latter.

With present-day transponders known in-house, it is common for a driver, preferably an aerial, to be encapsulated together with the integrated switching circuit. The effect of the encapsulation is that the aerial and the integrated switching circuit can no longer be contacted electrically from outside the encapsulation. The functions available on the integrated switching circuit can be used solely from the aerial. The aerial in connection with the integrated switching circuit is a purely passive system which is activated by an external high-frequency field. The integrated switching circuit draws its energy from the high-frequency field of the environment with the aid of the aerial. With the aid of this energy, the integrated switching circuit generates a signal which is in turn transmitted by the aerial.

Such a conventional transponder is also known from DE 196 28 802 A1. The transponder described therein is connected to two aerial coils. The aerial coils are connected via a contact area to an integrated switching circuit. With this transponder, however, the integrated switching circuit is not encapsulated and is thus unprotected against environmental influences.

A transponder is also known from DE 197 53 619, which has two aerials which jointly access an integrated switching circuit. Here too, however, the integrated switching circuit is not encapsulated with an aerial.

In present-day applications, it is entirely possible that active elements are also required in addition to the passive transponders. In the main, these active elements have an aerial which is operated from a second integrated switching circuit. These so-called transmitters draw their energy from an energy source provided in the device and transmit a signal via the aerial. Frequently, both the signal transmitted by the transponder and the signal transmitted by the transmitter have to be coded. In the course of coding, signals are changed from their signal space into a second signal space. This is necessary particularly when signals are coded. In the course of the coding, the signals are converted with the aid of a more or less complex transformation algorithm into signals which, without the corresponding coding key, cannot be returned to the original form, or can only be so with great effort. This is routinely the case when security-relevant information is transmitted with the aid of the signals. For the purpose of coding, the integrated switching circuits in the transponder as well as in the transmitter must make a coding algorithm available, with the aid of which the information-carrying signal is coded.

Since the coding algorithm in the transponder and also in the transmitter is often the same, it is a drawback with known transponder devices that they have to have two integrated switching circuits. This is absolutely essential, since the integrated switching circuit in the transponder cannot be contacted electrically from outside the encapsulation and its functions cannot therefore be used from outside the encapsulation. A further drawback emerges in the following, to the effect that the size and cost of the overall device increase considerably on account of the two required integrated switching circuits.

SUMMARY OF THE INVENTION

The problem underlying the invention, therefore, is to make available a transponder device, with which the integrated switching circuit of the transponder can be used from outside the encapsulation and on repeated occasions.

The problem derived and set out above is solved by the invention in such a way that the integrated switching circuit and the first driver are encapsulated with the carrier in such a way that the integrated switching circuit and the first driver can be contacted electrically from outside the encapsulation solely via the contact points, and that the integrated switching circuit encodes a first signal for the first driver. The great advantage of such a transponder device is the fact that the integrated switching circuit of the transponder can be used repeatedly. A coding algorithm available on the integrated switching circuit of the transponder can be used both for the coding of the transponder signal as well as for the coding of a signal applied from outside, for example the transmitter signal. It is in addition ensured that the transponder is protected by the encapsulation against environmental influences.

It is advantageous for a second driver to be arranged outside the encapsulation, for the integrated switching circuit to encode a second signal for the second driver and for the second signal to arrive at the second aerial via the contact areas. The coded signal can be fed to the second driver and transmitted via the contact points. The repeated use of the integrated switching circuit gives rise to enormous cost advantages over a device with two integrated switching circuits. In addition, the size of the overall transponder device is reduced considerably, since the space for a second integrated switching circuit can be saved.

In order to be able to transmit a first and/or a second signal via an air interface, it is proposed that the first and/or the second driver is designed as an aerial.

By means of the contact areas, it is possible for a driver circuit to generate a carrier signal, for the carrier signal to arrive at the integrated switching circuit via the contact areas and for the integrated switching circuit to generate the second signal from the carrier signal. This means that the carrier signal generated by the driver circuit is first fed via the contact areas to the integrated switching circuit, that this carrier signal is coded in the integrated switching circuit with the aid of the coding algorithm present on the integrated switching circuit and that this coded signal is relayed via the contact areas to the second driver, for example a second aerial.

Apart from the coding algorithm, it is possible to program on the integrated switching circuit sequencing controls, with the aid of which a status display for example, in particular a light-emitting diode, is controlled. The sequencing controls available on the integrated switching circuit are controlled in such a way that at least one switch arranged outside the encapsulation is connected to the integrated switching circuit via the contact areas and that the switch position influences the behaviour of the integrated switching circuit. The activation state of the transponder device is also controlled via the switches. Once a switch has been pressed, the sequencing control is activated, whereupon previously selected signals for example are transmitted by the transmitter. This takes place in such a way that the integrated switching circuit controls a sequence of functions inside the transponder device in dependence on the position of the switch, whereby the integrated switching circuit controls elements outside the encapsulation via the contact areas.

Although the same coding algorithm is used for the signal transmitted by the transmitter as well as for the signal transmitted by the transponder, it is advantageous for different keys to be used for the two signals. This is ensured by the fact that the integrated switching circuit encodes the first and the second signal with an identical coding algorithm, whereby a coding key for the first signal differs from a coding key for the second signal.

The status displays arranged outside the encapsulation are controlled by the integrated switching circuit via the contact areas. Through the status displays, the user has information on the current status of the transponder device.

In order to avoid interference between the signals and to ensure normal transponder functioning, the transponder device is designed in such a way that the first aerial sends at a frequency in the kHz range and the second aerial sends at a frequency in the MHz range.

For the purpose of easier contacting between the components arranged outside the encapsulation and the components arranged inside the encapsulation, it is proposed that the contact points are designed as a built-in grid array.

For the coding of the transmitter signal, the integrated switching circuit located inside the encapsulation requires energy. One possibility for supplying the integrated switching circuit with energy is characterised in that an energy supply is arranged outside the encapsulation and that the energy supply is connected to the integrated switching circuit via the contact areas. A battery, in particular a stud battery, arranged outside the encapsulation supplies the integrated switching circuit with energy via the contact areas. This ensures that the integrated switching circuit can encode a signal even outside a high-frequency field that is supplying the transponder with energy.

For the storage of field energy that is made available to the transponder through the high-frequency field, it is proposed that a capacitor, in addition to the integrated switching circuit and the driver, is encapsulated with the carrier and that the capacitor can be contacted electrically from outside the encapsulation solely via the contact points.

It has been shown that advantageous dimensioning of the transponder device is characterised by the fact that the carrier with the encapsulated components has a height of 1 to 10 mm, a width of 3 to 20 mm and a length of 5 to 30 mm.

To advantage, the encapsulation of the components on the carrier is ensured with a polycarbonate bond or an epoxy resin bond. These bonds serve to protect the transponder against environmental influences.

In order to adapt to the transponder device to the wishes of the respective users and to store individual sequencing controls, as well as for the purpose of storing a transmission procedure, a transmission rate and coding parameters and suchlike, it is proposed that the integrated switching circuit has a memory, whereby the memory collects data. The memory can for example be an EEPROM memory, which can be read out and described electrically. It is also proposed that the memory can be programmed via an air interface. This ensures high flexibility of the transponder device.

On account of the small construction of the transponder device, it is possible and proposed to integrate the transponder device in a key.

BRIEF DESCRIPTION OF THE DRAWINGS

The invention will be described in greater detail in the following with the aid of a drawing.

The following are shown.

DETAILED DESCRIPTION OF THE INVENTION

Figure 1:
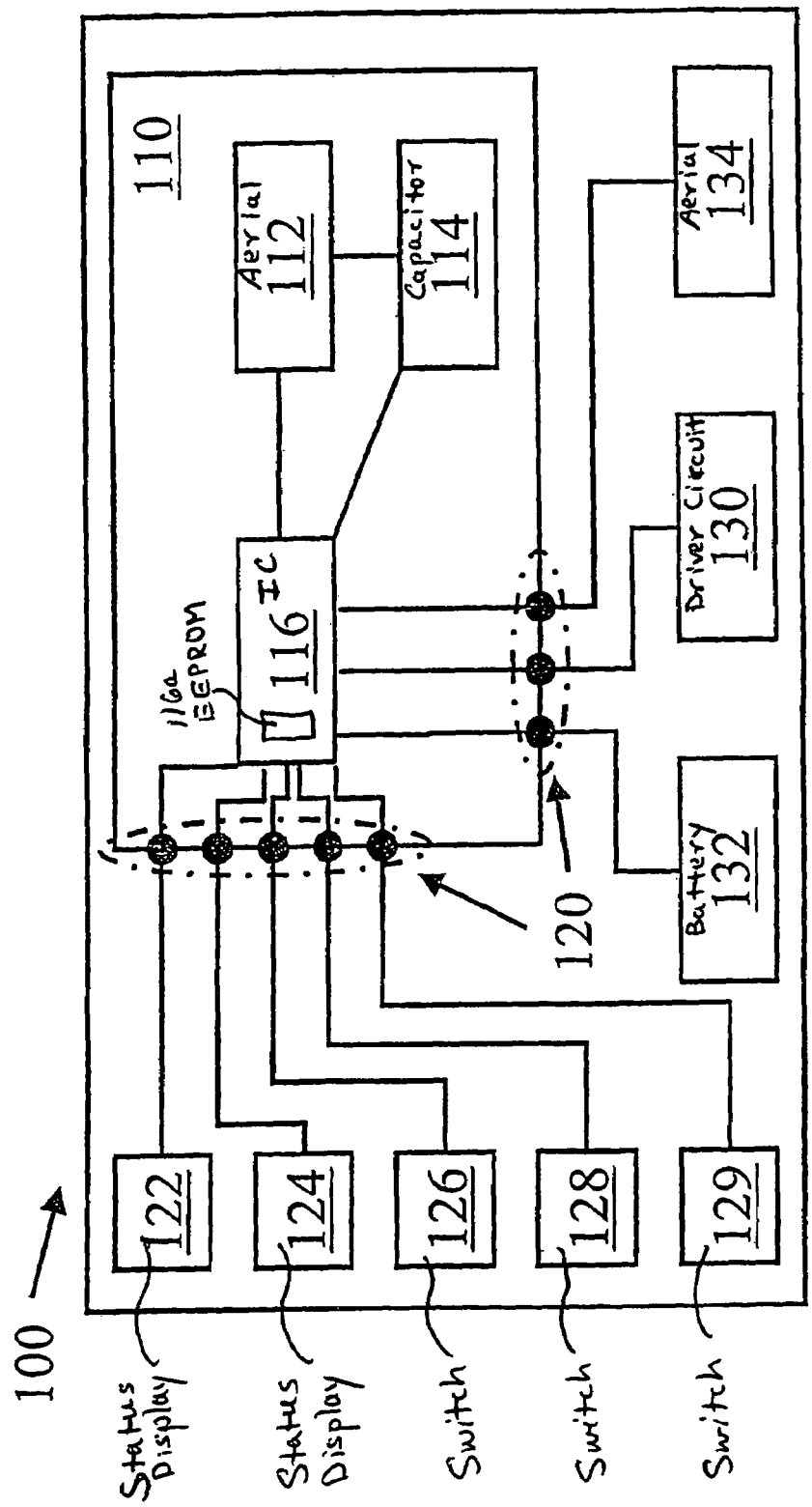
FIG. 1 a block diagram of a transponder device according to the invention.

Transponder device 100, which is represented in FIG. 1 as a block diagram, comprises an encapsulated transponder 110. An aerial 112, a capacitor 114 and an integrated switching circuit 116 with EEPROM 116a are arranged in encapsulated transponder 110. Aerial 112 draws its energy from a high-frequency field which is present in the environment of the transponder. This energy can be stored in capacitor 114 for a short time. With a high-frequency field present, the energy stored in capacitor 114 can be used for the purpose of encoding in integrated switching circuit 116 a signal which is in turn transmitted via aerial 112. Contact points 120 enable contacting of integrated switching circuit 116 by components 122–134 which are arranged outside the encapsulation. Energy source 132, e.g. a battery, supplies integrated switching circuit 116 with energy, even if transponder 110 is not in a high-frequency field. By means of this energy, it is possible to encode a signal which is fed from a driver circuit 130 to integrated switching circuit 116 via a contact area 120. The coded signal can be retrieved by integrated switching circuit 116 through the driver circuit 130 via a further contact area 120. Once the signal has been encoded, it is transmitted via a driver, which for example is formed as an aerial 134. By this means, an identification signal, for example, can be sent to a piece of equipment (not represented), e.g., a motor vehicle. By means of the coding with the aid of integrated switching circuit 116, it is ensured that the identification code cannot be retrieved by unauthorized persons. The functions of integrated switching circuit 116 can be influenced through switches 126, 128, 129. For this purpose, the switch positions are retrieved by integrated switching circuit 116 via contact areas 120. Depending on the state of integrated switching circuit 116 and on the switch positions of switches 126, 128, 129, status displays 122, 124 are controlled by integrated switching circuit 116. This again takes place via contact points 120. Through status displays 122, 124, the user has an overview of the functions currently operating in integrated switching circuit 116. As a result of the fact that integrated switching circuit 116 is available both for aerial 112 as well as for aerial 134, integrated switching circuit 116 is able to encode the signals transmitted by aerials 112, 134, with a coding algorithm.

Figure 2:
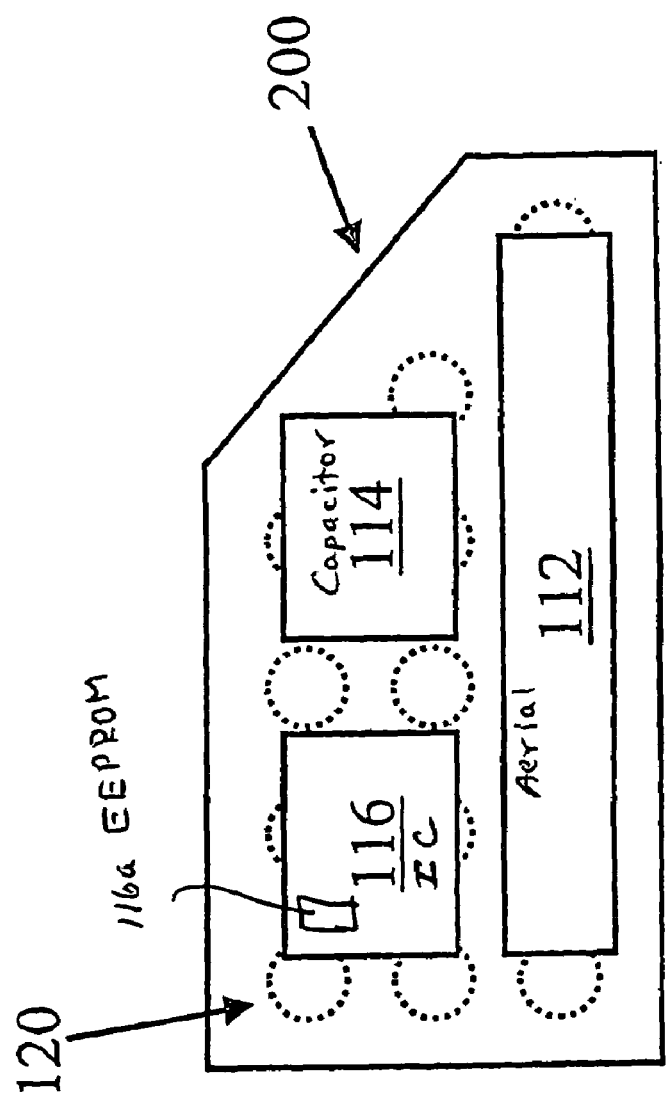
FIG. 2 a plan view of an encapsulated transponder.

Circuit board 200 represented in FIG. 2 has a width of 6.1 mm and a length of 12.1 mm. Integrated switching circuit 116, capacitor 114 and aerial 112 are deposited on the circuit board. Contact points 120 can be seen in FIG. 2 as dashed circles.

Figure 3:
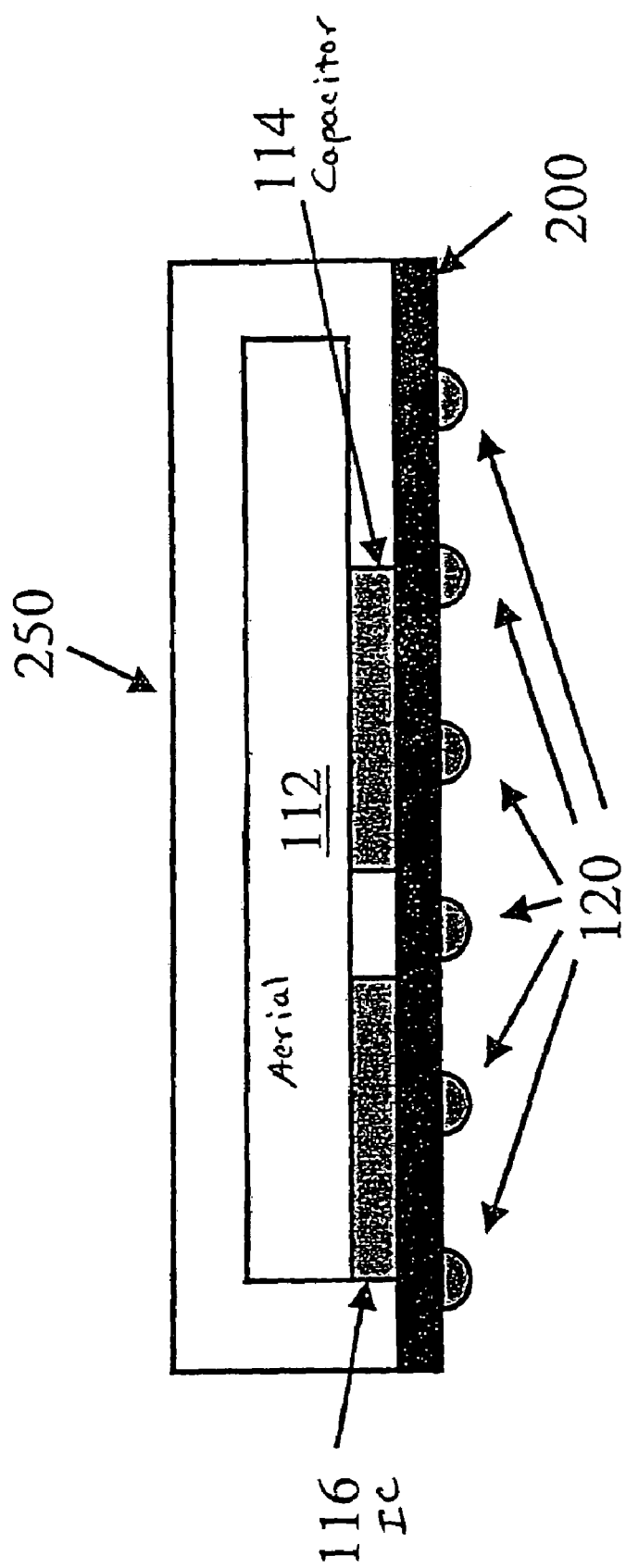
FIG. 3 a side view of an encapsulated transponder.

A side view of transponder 110 can be seen in FIG. 3. Encapsulated transponder 250 has a height of 3 mm. Contact points 120 are applied on encapsulated transponder 250. Aerial 112, integrated switching circuit 116 and capacitor 114 can be contacted electrically from outside encapsulation 250 via contact points 120. The electrical contacting of integrated switching circuit 116 enables joint use of the functions of integrated switching circuit 116 through both aerial 112 and aerial 134.

What is claimed is:

1. A transponder device for the identification of objects in front of pieces of equipment,
   with an integrated switching circuit (116),
   with a first driver (112) and
   with a carrier (200) accommodating a circuit, whereby
   the first driver (112) and the switching circuit (116) are deposited on a first surface of the carrier (200),
   a plurality of contact points (120) are deposited on a second surface of the carrier (200),
   the contact points (12) are connected electrically to the integrated switching circuit (116) and the first driver (112),
   the integrated switching circuit (116) and the first driver (112) are encapsulated with the carrier (200) in such a way that at least the integrated switching circuit (116) can be contacted electrically from outside the encapsulation solely via the contact points (120),
   the integrated switching circuit (116) is formed for the coding of a first signal for the first driver (112),
   a second driver (134) arranged outside the encapsulation is provided,
   the integrated switching circuit (116) is formed for the coding of a second signal for the second driver (134), and
   the second driver (134) is connected electrically to the integrated switching circuit (116) via the contact areas (120) for the transfer of the second signal between integrated switching circuit (116) and the second driver (134),
   the integrated switching circuit (116) and the first driver (112) can be contacted electrically from outside the encapsulation solely via the contact points.

2. The transponder device according to claim 1, wherein the first and/or second driver (112, 134) are designed as an aerial.

3. The transponder service according to claim 2, wherein first aerial (112) sends at a frequency in the kilohertz range and that the second aerial (134) sends at a frequency in the megahertz range.

4. The transponder device according to claim 1, wherein a driver circuit (130) is provided for the generation of a carrier signal, that the driver circuit is connected to the integrated switching circuit (116) via contact areas (120) for the transfer of the carrier signal and that the integrated switching circuit (116) is formed for the generation of the second signal from the carrier signal.

5. The transponder device according to claim 1, wherein at least one switch (126, 128, 129) arranged outside the encapsulation is connected to the integrated switching circuit (116) via the contact areas (120) and that the switch position influences the behavior of the integrated switching circuit (116).

6. The transponder service according to claim 5, wherein the integrated switching circuit (116) controls a sequence of functions inside the transponder device depending on the position of the switch (126, 128, 129), whereby the integrated switching circuit (116) is formed for the control of elements outside the encapsulation via the contact areas (120).

7. The transponder service according to claim 1, wherein the integrated switching circuit (116) is formed for the coding of the first and the second signal with an identical coding algorithm, whereby a coding key for the first signal differs from a coding key for the second signal.

8. The transponder service according to claim 1, wherein at least one status indicator (122, 124) is arranged outside the encapsulation and that the integrated switching circuit (116) is formed for the control of the status indicator (122, 124) via the contact areas (120).

9. The transponder service according to claim 1, wherein the contact points (120) are designed as a ball-grid array.

10. The transponder service according to claim 1, wherein an energy supply (132) is arranged outside the encapsulation and that the energy supply (132) is connected to the integrated switching circuit (116) via the contact areas (120).

11. The transponder service according to claim 1, wherein a capacitor (114), in addition to the integrated switching circuit (116) and the driver (112), is encapsulated with the carrier (200) and that the capacitor (114) can be contacted electrically from outside the encapsulation solely via the contact points (120).

12. The transponder service according to claim 11, wherein the carrier (200) with the encapsulated components (112, 114, 116) has a height of 1 to 10 mm, a width of 3 to 20 mm and a length of 5 to 30 mm.

13. The transponder service according to claim 11, wherein the components (112, 114, 116) are encapsulated with a polycarbonate bond.

14. The transponder service according to claim 11, wherein the components (112, 114, 116) are encapsulated with an epoxy resin bond.

15. The transponder service according to claim 1, wherein the integrated switching circuit (116) has a memory (EEPROM), whereby the memory collects data.

16. The transponder service according to claim 15, wherein the memory can be programmed via an air interface.

17. The transponder service according to claim 1, wherein the transponder device is integrated into a key.

18. A transponder device for the identification of objects in front of pieces of equipment,
   with an integrated switching circuit (116),
   with a first driver (112) and
   with a carrier (200) accommodating a circuit, whereby
   the first driver (112) and the switching circuit (116) are deposited on a first surface of the carrier (200),
   a plurality of contact points (120) are deposited on a second surface of the carrier (200),
   the contact points (12) are connected electrically to the integrated switching circuit (116) and the first driver (112),
   the integrated switching circuit (116) and the first driver (112) are encapsulated with the carrier (200) in such a way that at least the integrated switching circuit (116) can be contacted electrically from outside the encapsulation solely via the contact points (120),
   the integrated switching circuit (116) is formed for the coding of a first signal for the first driver (112),
   a second driver (134) arranged outside the encapsulation is provided,
   the integrated switching circuit (116) is formed for the coding of a second signal for the second driver (134), and
   the second driver (134) is connected electrically to the integrated switching circuit (116) via the contact areas (120) for the transfer of the second signal between integrated switching circuit (116) and the second driver (134), a driver circuit (130) is provided for the generation of a carrier signal, that the driver circuit is connected to the integrated switching circuit (116) via contact areas (120) for the transfer of the carrier signal, and that the integrated switching circuit (116) is formed for the generation of the second signal from the carrier signal.

19. A transponder device for the identification of objects in front of pieces of equipment,
with an integrated switching circuit (116),
with a first driver (112) and
with a carrier (200) accommodating a circuit, whereby
the first driver (112) and the switching circuit (116) are deposited on a first surface of the carrier (200),
a plurality of contact points (120) are deposited on a second surface of the carrier (200),
the contact points (12) are connected electrically to the integrated switching circuit (116) and the first driver (112),
the integrated switching circuit (116) and the first driver (112) are encapsulated with the carrier (200) in such a way that at least the integrated switching circuit (116) can be contacted electrically from outside the encapsulation solely via the contact points (120),
the integrated switching circuit (116) is formed for the coding of a first signal for the first driver (112),
a second driver (134) arranged outside the encapsulation is provided,
the integrated switching circuit (116) is formed for the coding of a second signal for the second driver (134), and
the second driver (134) is connected electrically to the integrated switching circuit (116) via the contact areas (120) for the transfer of the second signal between integrated switching circuit (116) and the second driver (134),
the integrated switching circuit (116) controls a sequence of functions inside the transponder device depending on the position of a switch (126, 128, 129), whereby the integrated switching circuit (116) is formed for the control of elements outside the encapsulation via the contact areas (120).

20. A transponder device for the identification of objects in front of pieces of equipment,
with an integrated switching circuit (116),
with a first driver (112) and
with a carrier (200) accommodating a circuit, whereby
the first driver (112) and the switching circuit (116) are deposited on a first surface of the carrier (200),
a plurality of contact points (120) are deposited on a second surface of the carrier (200),
the contact points (12) are connected electrically to the integrated switching circuit (116) and the first driver (112),
the integrated switching circuit (116) and the first driver (112) are encapsulated with the carrier (200) in such a way that at least the integrated switching circuit (116) can be contacted electrically from outside the encapsulation solely via the contact points (120),
the integrated switching circuit (116) is formed for the coding of a first signal for the first driver (112),
a second driver (134) arranged outside the encapsulation is provided,
the integrated switching circuit (116) is formed for the coding of a second signal for the second driver (134), and
the second driver (134) is connected electrically to the integrated switching circuit (116) via the contact areas (120) for the transfer of the second signal between integrated switching circuit (116) and the second driver (134)
a capacitor (114), in addition to the integrated switching circuit (116) and the driver (112), is encapsulated with the carrier (200), and that the capacitor (114) can be contacted electrically from outside the encapsulation solely via the contact points (120).

21. A transponder device for the identification of objects in front of pieces of equipment,
with an integrated switching circuit (116),
with a first driver (112) and
with a carrier (200) accommodating a circuit, whereby
the first driver (112) and the switching circuit (116) are deposited on a first surface of the carrier (200),
a plurality of contact points (120) are deposited on a second surface of the carrier (200),
the contact points (12) are connected electrically to the integrated switching circuit (116) and the first driver (112),
the integrated switching circuit (116) and the first driver (112) are encapsulated with the carrier (200) in such a way that at least the integrated switching circuit (116) can be contacted electrically from outside the encapsulation solely via the contact points (120),
the integrated switching circuit (116) is formed for the coding of a first signal for the first driver (112),
a second driver (134) arranged outside the encapsulation is provided,
the integrated switching circuit (116) is formed for the coding of a second signal for the second driver (134), and
the second driver (134) is connected electrically to the integrated switching circuit (116) via the contact areas (120) for the transfer of the second signal between integrated switching circuit (116) and the second driver (134),
the integrated switching circuit (116) has a memory (EEPROM), whereby the memory collects data.

* * * * *